Sept. 13, 1960

H. S. JAFFE 2,952,039

METHOD OF MAKING A TWO-PART CONTAINER
FROM AN EXTRUDED BLANK

Filed April 3, 1957

INVENTOR.
HERBERT S. JAFFE
BY
*Percy Freeman*
ATTORNEY.

United States Patent Office 2,952,039
Patented Sept. 13, 1960

2,952,039

METHOD OF MAKING A TWO-PART CONTAINER FROM AN EXTRUDED BLANK

Herbert S. Jaffe, 225 Harbor Road, Hewlett Harbor, N.Y.

Filed Apr. 3, 1957, Ser. No. 650,484

2 Claims. (Cl. 18—47.5)

This invention relates to containers and more particularly to containers that are adapted for various purposes, and particularly to a method of making same.

With the purpose of producing an attractive and well constructed container that may be adapted for various aesthetic and functional purposes, this invention contemplates the use of extruded plastic materials that may be formed to substantially any predetermined shape and provided with integral support means for securing top and bottom closures and partitions thereto. As such, the cost of materials and labor may be substantially reduced to provide a finished container that is not only attractive and sufficiently strong for the purpose intended, but which can also be manufactured at a comparatively lower cost than that of comparable containers now being produced by more conventional methods.

Accordingly, one of the main objects of the present invention is to produce a container constructed of a main side wall of substantially uniform configuration, and formed in accordance with any predetermined design, that has means for supporting top and bottom closures to define the storage compartment therebetween.

Another object of the present invention is to produce a container that includes a substantially thin side wall that is formed to any desired shape without having to mitre or otherwise specially treat the corners or curves thereof, and which is provided with integral support means for supporting spaced top and bottom closure means which define a storage compartment therewith.

A still further object of this invention is to produce a walled container having a lower storage compartment and an upper cover member formed from a single continuous strip of extruded plastic material, each having integral means for supporting a substantially rigid enclosure member at opposite sides thereof, and being at least partially severed along a line to define a hinged joint therebetween.

A more specific object of the present invention is to produce a continuous strip of extruded plastic material that may be used to form the side wall of a container of substantially any desired shape, each transverse extremity thereof having means for supporting a top or bottom closure member defining a compartment therebetween, and which may be at least partially severed along a longitudinal line parallel to the opposite sides of the strip so as to separate the compartment into a lower storage unit and an upper cover member.

Another object of the present invention is to provide a novel method for manufacturing containers of the above type that require a minimum number of forming and assembly steps, effects a substantial saving in time and material, and which produces a neat and attractive finished product.

All of the foregoing and still further objects and advantages of this invention will become apparent from a study of the following specifications, taken in connection with the accompanying drawing, wherein.

Figure 1:
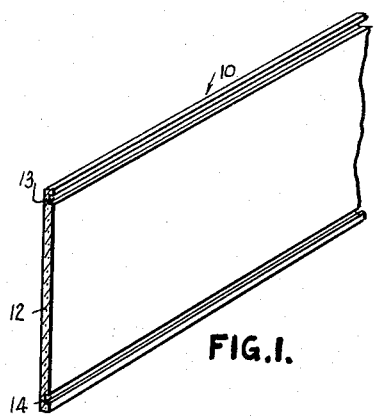
Fig. 1 is a perspective view of an extruded plastic strip constructed in accordance with one form of the present invention.

Referring now to Fig. 1 of the drawing, a preformed flexible strip 10, preferably of suitably extruded plastic material, is shown to include a main web portion 12. Each opposite lateral extremity of the web 12 is provided with a longitudinally extending, channel-shaped groove 13, 14, for purposes hereinafter described.

Figure 4:
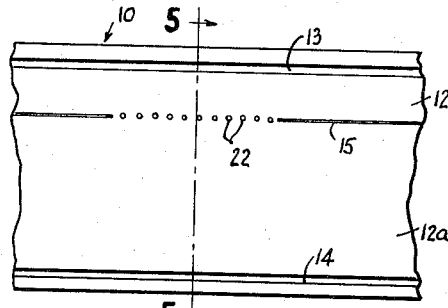
Fig. 4 is a fragmentary side elevational view of a section of the wall member shown in Fig. 1, partially severed along a longitudinal severance line.

In manufacture, the section 10 is adapted to be severed along a longitudinal severance line 15, as shown in Fig. 4, to divided the wall into a lower base wall 12a and an upper cover wall 12b. After cutting the severed strip to the desired length, it may be formed, such as by the application of heat or pressure, to a desired configuration, either before or after the respective top and bottom closures 17, 18, are inserted into the associated groove 13, 14. The ends of the strip are secured together by any desired method, whereupon the upper and lower portions assume a substantially identical shape.

Figure 3:
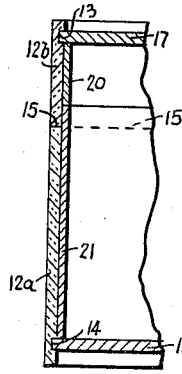
Fig. 3 is a view similar to Fig. 2, showing a modified form of container construction.

If desired, a top liner 20, preferably of a substantially rigid and attractive material, is secured to the inner surface of the cover portion 12b and a similar bottom liner 21 is secured to the inner surface of the lower compartment wall member 12a. As shown in Fig. 3, the upper and lower liner members are of such predetermined dimensions that they meet along a line that is spaced from the severance or meeting line 15 of the upper and lower wall members 12a, 12b. Thus, a portion of the lower liner 21 extends upwardly beyond the top of the lower wall 12a so as to define an abutment against which the upper wall member 12b may be guided into proper closing relationship with the storage compartment of the container and secured thereon against lateral displacement.

As is more clearly shown in Fig. 4, the severance line 15 may extend only partially around the container, the remainder thereof being provided with a line of spaced perforations 22 that merely weaken that portion of the strip, whereby a hinge effect may be obtained. As is more clearly shown in Figs. 5 and 6, the perforations 22 and the inherent resiliency of the material, permit the closure portion to hingedly rotate with respect to the compartment portion without the use of additional hinge elements.

Figure 2:
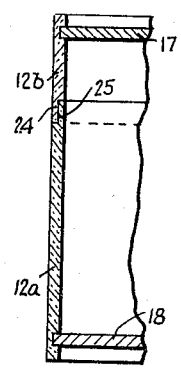
Fig. 2 is a transverse cross-sectional view of a container made in accordance with one form of the present invention.
Figure 5:
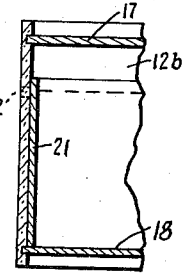
Fig. 5 is a cross-sectional view taken along line 5—5 of Fig. 4, showing the use of the partially severed walled construction in a container made in accordance with the present invention.
Figure 6:
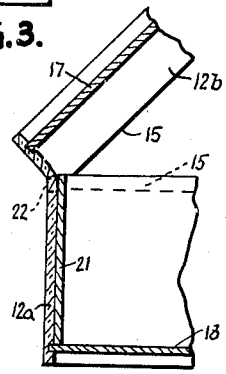
Fig. 6 is a view similar to Fig. 5, showing the container in a partially open position.

If desired, the aforementioned liners 20, 21, may be eliminated, as shown in Fig. 2. In this arrangement, the adjacent edges of the lower wall member 12a and the upper wall member 12b are provided with recesses 24, 25, respectively, so that they are guided into flush mating engagement to properly position the parts in a closed position. Similarly, as shown in Figs. 5 and 6, the upper liner 20 may be eliminated, if desired, without adversely affecting the stated manner in which the parts engage each other.

Figure 10:
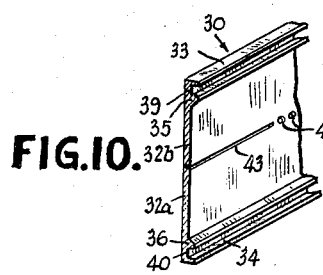
Fig. 10 is a view similar to Fig. 1, showing a modified form of side wall construction.

Referring now to Fig. 10 of the drawing, a modified form of extruded section 30 is shown wherein the main web portion may be of very thin gauge. In this arrangement, the strip is provided with a perpendicularly related flange 33, 34, at each opposite lateral extremity and a rib 35, 36, of substantially triangular cross section that is spaced from the adjacent flanges 33, 34, so as to define separate channel-shaped grooves 39, 40, therebetween. In a manner hereinbefore described, each of these grooves 39, 40, is arranged to receive the peripheral edge portion of the upper and lower closure members. The oppositely sloping surfaces of the triangular ribs 35, 36, facilitate the assembly of the closure members and also maintain the weight of the side wall at a minimum without sacrificing the needed strength to rigidly secure the closure members therein. The extruded section 30 may also be provided with a severance line 43, and spaced perforations 44 to obtain the lower and upper wall sections 32a, 32b of the hinged boxed construction.

Figure 11:
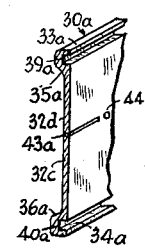
Fig. 11 is a view similar to Fig. 1, showing a still further modified form of side wall construction.

In Fig. 11 of the drawing, a further modified form of the present invention is shown wherein the main web portion is provided with an outwardly extending rib 35a, 36a at each of the lateral edges. Each rib 35a, 36a is provided with an inwardly opening groove 39a, 40a that is defined by an upper and lower flange 33a, 34a, respectively. Thus, in the aforementioned manner, each groove 39a, 40a is arranged to receive the peripheral edge portion of the respective upper and lower closure members. A longitudinal severance line 43a and spaced perforations 44a permit the main web portion to be divided into a hingedly connected pair of upper and lower wall sections 32d, 32c, to provide the hinged closure construction. In this arrangement, the main web provides an attractive outwardly ribbed surface while providing a continuous smooth inner surface.

Figure 7:
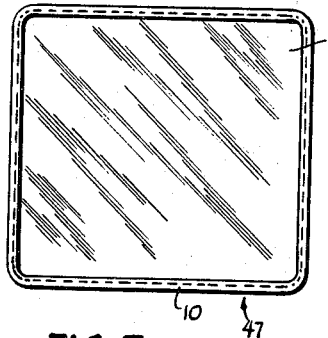
Fig. 7 is a top plan view of a container made in accordance with the present invention, of substantially square configuration.
Figure 8:
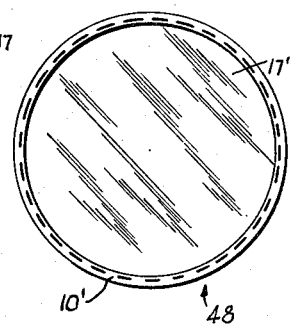
Fig. 8 is a view similar to Fig. 7, showing a container constructed of substantially circular configuration.
Figure 9:
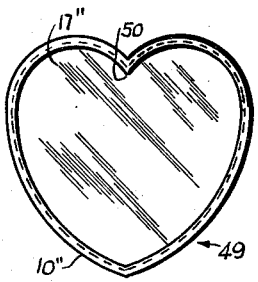
Figure 9 is a view similar to Fig. 7, showing a container of heart-shaped configuration.

It will be recognized that the substantially smooth continuous surfaces of the extruded strip permits the strip to be formed into substantially any desired shape. The absence of any wide perpendicularly extending flanges permits reasonable bends to be made without having to first mitre the corners and to otherwise permit such bends to be made without distortion. Referring to Figs. 7 to 9, a few examples of such shapes are shown. In Fig. 7, the container 47 is of rectangular configuration as defined by the wall portion 10 and top closure 17. In Fig. 8, the container 48 is of circular configuration, wherein the wall portion 10' and the upper closure 17' are so shaped. In Fig. 9, the container 49 is of heart-shaped configuration, as defined by the wall portion 10" and the top closure 17". The heart-shaped construction illustrates the manner in which a sharp bend may be had without altering the construction of the wall elements by joining the ends of the extruded strip together at the sharpest corner 50 of the selected shape, whereas the other curves may be readily formed by the aforementioned procedure.

It will be recognized that by selecting the proper size and type of material used for this construction, a container for any desired purpose may be manufactured. Of course, where substantially no stresses are to be imposed upon the parts, each element may be highly decorative and of substantially light construction. On the other hand, where the containers are to be used for packing and shipping cases, for luggage, and the like, the strength characteristics become more important and such must be considered in selection of the size, shape, and types of material.

Substantially the same method may be followed to construct containers using any of the aforementioned wall types. The wall portion is preferably constructed of an extruded flexible material, such as polyethylene. After extruding the material to the desired cross-sectional shape, it is cut to the proper length. The longitudinally extending slit lines and perforations are also made to provide either a partially hinged or a completely separable relationship between the upper cover wall and lower base wall. These slit lines and perforations are preferably made by the use of a cutting or perforating wheel that is associated with the extruding apparatus during the extrusion of the material. The wall members are then bent around the entire circumference of the closure members, after which, the respective ends of the wall members are secured together, such as by the application of heat and pressure. In practice, the top and bottom closures are preferably, though not necessarily, secured to a jig or fixture which is of the size and contour intended for the interior of the finished container, to maintain the closures in proper assembled relationship during the bending of the wall members. The interior and exterior portions of the completed container may then be finished and the compartment filled.

This invention also contemplates replacing the severance line on the side wall with merely a weakening line, such as a continuous line of closely spaced perforations. Thus, the top and bottom closures may be used to confine the contents within the side wall so that they can be removed by severing the side wall along the line of perforations. Thus, an attractive and destructible seal type container may be readily provided. In this construction, the contents are placed between the top and bottom closures prior to the steps of sealing together the free ends of the side walls. Thus, upon completion, the container is completely sealed at the top and bottom and along the side wall so that access to the contents thereof may be had only after the side wall is fractured along the perforations or weakening line.

Therefore, while this invention has been described with particular reference to the construction shown in the drawing, it is to be understood that such is not to be construed as imparting limitations upon the invention, which is best defined by the claims appended hereto.

I claim:

1. A method of constructing a two-part container comprising a body and a cover, comprising the steps of: extruding a substantially thin flexible side wall portion having a pair of transversely spaced longitudinally extending grooves along the marginal edges thereof, providing a top closure and a bottom closure of substantially identical configuration, cutting the side wall to a length corresponding to the perimeter of said top and bottom closures, forming a severance line on said side wall extending longitudinally thereof between, and parallel to, said grooves, inserting the top and bottom closures each in one of the grooves in the side wall, bending said side wall around said closures, sealing together the opposite free ends of the side wall, and separating the container along the severance line to form said body and said cover.

2. The method of claim 1 wherein said severance line is extended throughout only a portion of the length of said side wall, and perforating the remainder of said side wall in alignment with the severance line to form a hinge portion whereby when said body and said cover are separated along said severance line said perforated hinge portion hingedly connects said body and said cover.

References Cited in the file of this patent

UNITED STATES PATENTS

| | | |
|---|---|---|
| 1,999,796 | Zinser | Apr. 30, 1935 |
| 2,106,738 | Harrison | Feb. 1, 1938 |
| 2,128,239 | Ferngren | Aug. 30, 1938 |
| 2,157,794 | McDonald et al. | May 9, 1939 |
| 2,388,297 | Slaughter | Nov. 6, 1945 |
| 2,589,022 | Page et al. | Mar. 11, 1952 |
| 2,657,431 | Slaughter | Nov. 3, 1953 |
| 2,739,727 | Fudge | Mar. 27, 1956 |
| 2,764,308 | Hoch | Sept. 25, 1956 |

OTHER REFERENCES

Taber Plastic Fabricating Machines, Taber Instrument Corp., 111 Goundry St., North Tonawanda, N.Y. Received by Patent Office August 4, 1950.